United States Patent [19]
Jordan

[11] 3,863,950
[45] Feb. 4, 1975

[54] RIDER-PROPELLED VEHICLE

[76] Inventor: Gerald J. Jordan, 127 West Chicago, Marceline, Mo. 64658

[22] Filed: Apr. 26, 1974

[21] Appl. No.: 464,300

Related U.S. Application Data

[63] Continuation-in-part of Ser. No. 271,551, July 13, 1972, Pat. No. 3,807,760.

[52] U.S. Cl. ............................ 280/218, 280/1.181
[51] Int. Cl. ............................................ B62m 1/00
[58] Field of Search ...................... 280/218, 1.181

[56] References Cited
UNITED STATES PATENTS

| | | | |
|---|---|---|---|
| 1,800,587 | 4/1931 | Appleby | 280/218 |
| 1,977,317 | 10/1934 | Maypole | 280/1.182 |
| 2,539,640 | 1/1951 | Sebel | 280/1.181 |
| 3,023,025 | 2/1962 | Grieder | 280/218 |
| 3,807,760 | 4/1974 | Jordan | 280/218 |

FOREIGN PATENTS OR APPLICATIONS
646,351  11/1950  Great Britain ................... 280/1.181

*Primary Examiner*—Leo Friaglia
*Attorney, Agent, or Firm*—Koenig, Senniger, Powers and Leavitt

[57] ABSTRACT

A rider-propelled wheeled vehicle comprising a pair of wheels mounted on an axle swingable 360° on an upright axis and rider operable means for propelling and steering the vehicle including means for swinging the above-said axle about its upright axis. Means are provided associated with each wheel carried by the swingable axle permitting rotation thereof in one direction but preventing rotation thereof in the opposite direction. Thus, with the axle in a first neutral position (i.e., generally perpendicular to the longitudinal axis of the vehicle) the vehicle may be propelled forwardly by swinging the axle, and with the axle in a second neutral position 180° from the first, the vehicle may be propelled rearwardly.

10 Claims, 9 Drawing Figures

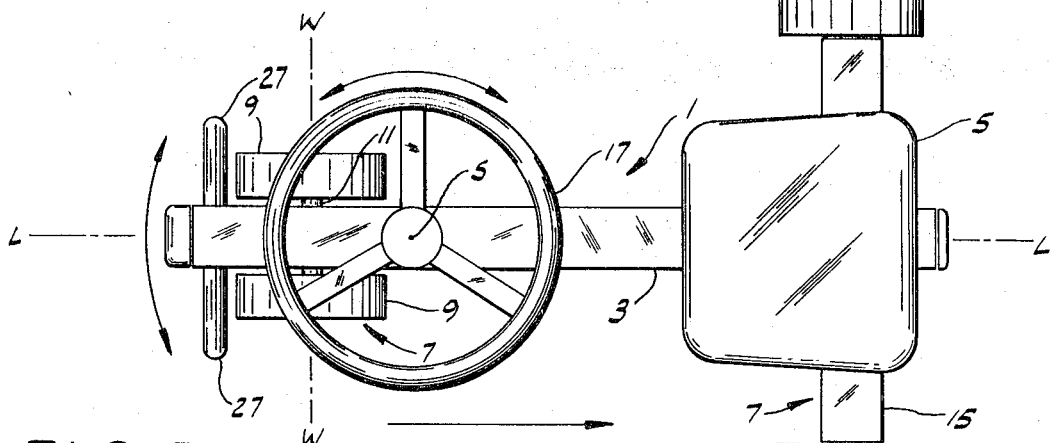
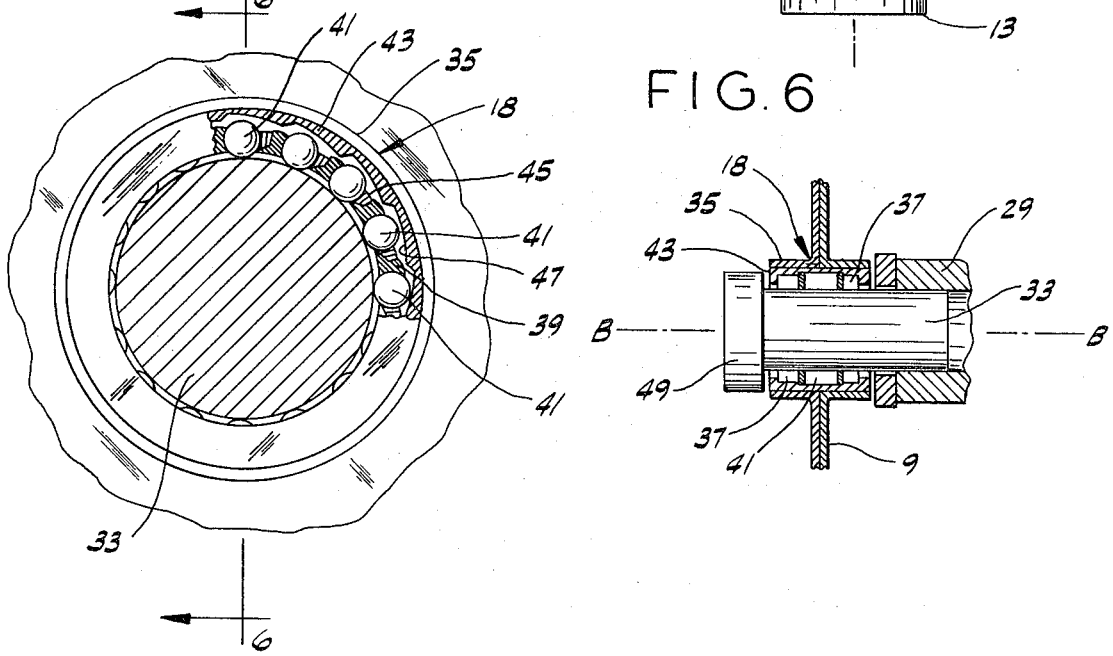
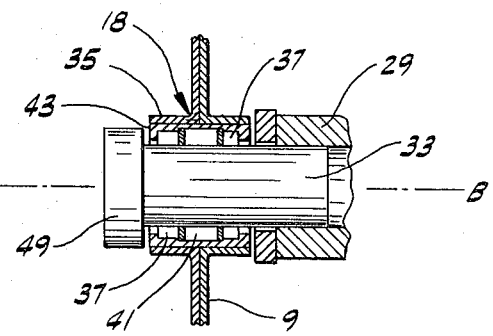

RIDER-PROPELLED VEHICLE

CROSS-REFERENCE TO RELATED APPLICATION

This application is a continuation-in-part of my copending U.S. Pat. application Ser. No. 271,551, filed July 13, 1972 and now U.S. Pat. No. 3,807,760.

BACKGROUND OF THE INVENTION

This invention relates to a rider-propelled vehicle and more particularly to a child's toy vehicle of this class.

My above-mentioned copending patent application discloses a rider-propelled vehicle having a swingable front axle with wheels rotatable only in generally forward direction. Propulsion of this prior vehicle is effected by swinging handlebars connected to the front axle. While this rider-propelled vehicle may easily be operated by a child, this previous vehicle could only be propelled or coast in a generally forward direction and not in reverse.

SUMMARY OF THE INVENTION

Among the several objects of the invention may be noted the provision of an improved rider-propelled vehicle operable by the rider swinging wheel means of the vehicle via a steering wheel or handlebars; the provision of such a vehicle is propelled with ease and without excessive critical body movement; the provision of such a vehicle which can be propelled in either a forward or reverse direction; the provision of one embodiment of such a vehicle of this invention which is propelled by swinging the rear axle of the vehicle thereby to push the vehicle rather than to pull it; the provision of such a vehicle adapted for embodiment in many styles which may be economically manaufactured, and which is safe to operate.

Briefly, a rider-propelled vehicle of this invention comprises a frame and a seat mounted on the frame for supporting a rider. Wheel means are provided for supporting the frame above the ground including an axle mounted for swinging movement midway between its ends relative to the frame on an upright axis, this axis being rotatable 360° about the upright axis. The wheel means includes a pair of wheels carried by the swingable axle spaced generally at equal distances on opposite sides of the upright axis with the wheels on a common generally horizontal axis. The vehicle further comprises rider operable means for propelling and steering the vehicle including means for swinging the axle about its upright axis and means associated with each wheel carried by the swingable axis permitting rotation thereof in one direction with respect to the axle but preventing rotation thereof in the opposite direction with respect to the axle. This swingable axis is adapted to occupy a first neutral position in which the axis of the wheels is generally perpendicular to the longitudinal axis of the vehicle and the wheels are rotatable so as to permit forward rolling of the vehicle in the direction of its longitudinal axis. The swingable axle is also adapted to occupy a second neutral position in which the axis of the wheels is generally perpendicular to the longitudinal axis of the wheels and the wheels are rotatable so as to permit rearward rolling of the vehicle in the direction of its longitudinal axis. The axle is swingable on the upright axis in opposite directions about its first neutral position for effecting generally forward propulsion of the vehicle via one wheel being held against reverse rotation while the other rotates in forward direction and the axle swings forward on the point of engagement of the held wheel with the ground thereby to propel the vehicle forward. Similarly, the axle is swingable on the upright axis in opposite directions about its second neutral position for effecting generally rearward propulsion of the vehicle via one wheel being held against forward rotation while the other rotates in reverse direction and the axle swings rearward on the point of engagement of the last-mentioned held wheel thereby to propel the vehicle backwards.

Other objects and features will be in part apparent and in part pointed out hereinafter.

BRIEF DESCRIPTION OF THE DRAWINGS

FIG. 5 is an enlarged elevational view with parts broken away of a one-way clutch bearing assembly journalling the steerable drive wheels and permitting rotation thereof in one direction but preventing rotation in the opposite direction;

FIG. 6 is a reduced scale horizontal section on line 6—6 of FIG. 5;

FIG. 7 is a view simlar to FIG. 1 illustrating the steerable drive wheels swung 180° to a second neutral position in which the wheels may be rotated to drive the vehicle in reverse;

Corresponding reference characters indicate corresponding parts throughout the several views of the drawings.

DESCRIPTION OF THE PREFERRED EMBODIMENTS

Figure 1:
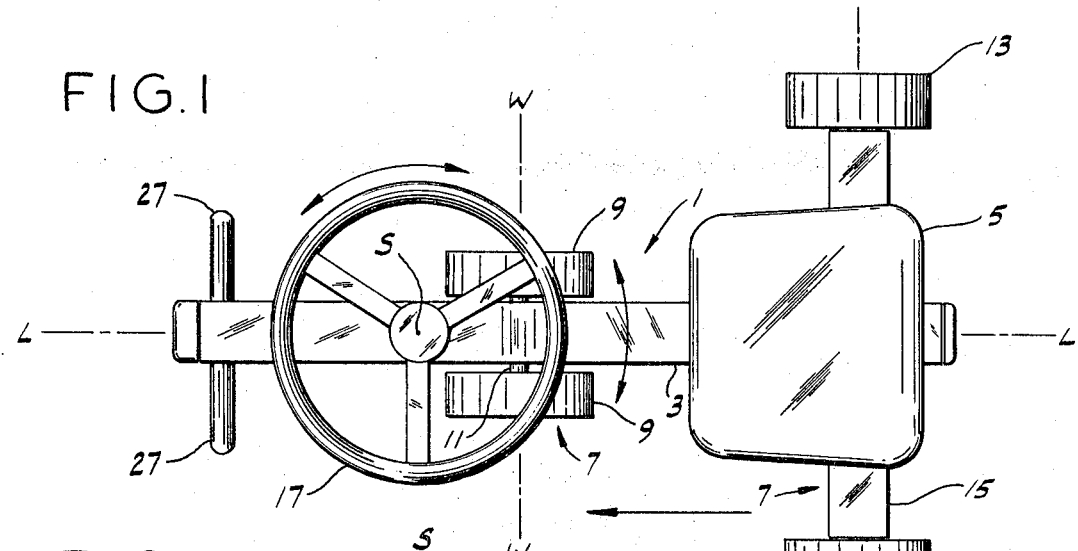
FIG. 1 is a plan view of a rider-propelled vehicle of this invention.

Referring now to the drawings, a rider-propelled wheeled vehicle of this invention, indicated in its entirety at 1, is shown to comprise a frame 3 extending longitudinally of the vehicle, a seat 5 mounted on the frame for supporting the rider, and wheel means generally indicated at 7 for rotatably supporting the frame above the ground. A pair of front steerable drive wheels, each indicated at 9, is journalled on an axle 11 mounted for swinging movement midway between its ends relative to frame 3 on a vertical swing axis S. Wheels 9 are spaced at equal distances on opposite sides of the swing axis and are journalled on a common horizontal wheel axis W. Axle 11 is rotatable 360° about the swing axis. A pair of rear wheels 13 is journalled on a fixed axle 15 extending at generally right angles to the longitudinal axis of the vehicle.

Figure 2:
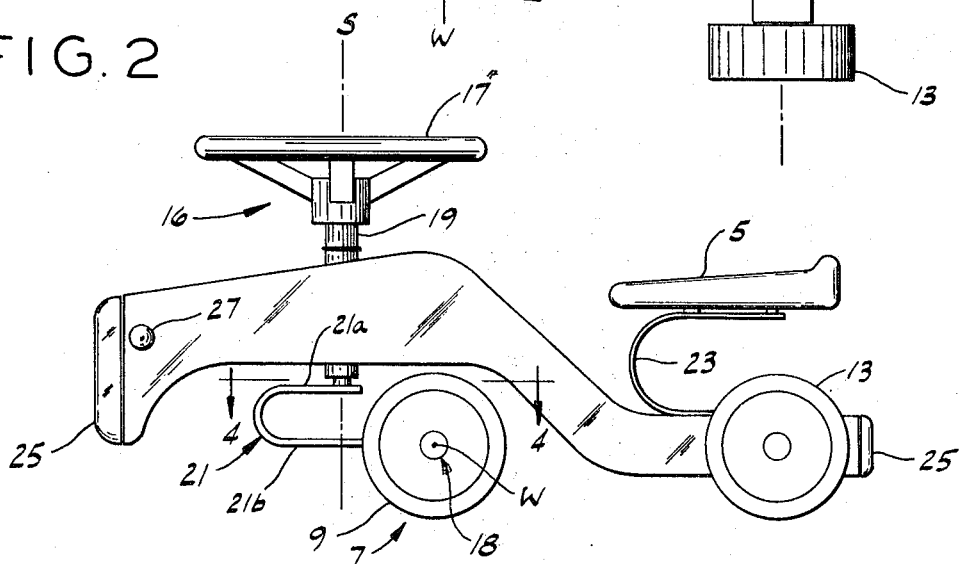
FIG. 2 is a left side elevational view of FIG. 1 with its steerable drive wheels in position for propelling and for steering the vehicle in a generally forward direction.
Figure 3:
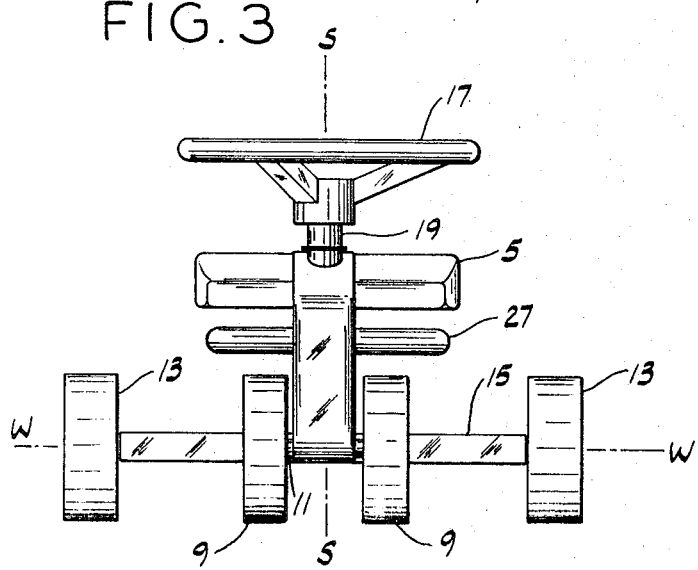
FIG. 3 is a front elevation of FIG. 1.

Vehicle 1 further includes rider operable means, as generally indicated at 16, for propelling and for steering the vehicle. This means includes means for swinging axle 11 about its upright swing axis S comprising a steering wheel 17 manipulatable by the rider from seat 5, and so-called unidirectional drive means 18 associated with each front wheel 9. The unidirectional means 18 comprises a one-way clutch and bearing assembly as will be explained in detail hereinafter. These one-way clutch and bearing assemblies permit rotation of each wheel 9 in one direction with respect to axle 11 but prevent rotation thereof in the opposite direction. When the wheels are in their position as shown in FIG. 2 with axle 11 closer to rear axle 15 than the swing axis S, wheels 9 are permitted to roll so that the vehicle can roll forwardly (i.e., the direction of the arrow as shown in FIG. 1). However, when the wheels are in the position as shown in FIG. 7 with swing axis S closer to the rear axle 15 than axle 11, the one-way clutches 18 permit rolling of the vehicle in reverse direction as indicated by the arrow in FIG. 7. Normally, axle 11 is disposed in one of two neutral positions in which wheel axis W is generally at right angles to the longitudinal axis of the vehicle thereby to permit rolling of the vehicle on either forward or reverse direction. When axle 11 is in its first neutral position (as shown in FIGS. 1 and 2), axle 11 is swingable on axis S in opposite directions as indicated by the arrow in FIG. 1 and as shown in phantom in FIG. 4 for effecting propulsion of the vehicle in forward direction via one front wheel 9 being held against reverse rotation while the other wheel rotates in forward direction and as axle 11 swings forward on the point of engagement of the held wheel with the ground thereby to pull the vehicle forward. Similarly, when axle 11 is in its second neutral position (as shown in FIG. 7) the axle is swingable in the opposite direction on swing axis S for effecting reverse propulsion of the vehicle via one front wheel being held against forward rotation while the other wheel rotates in the reverse direction and axle 11 swings rearward on the point of engagement of the last-mentioned held wheel with the ground thereby to propel the vehicle rearwardly. It will be understood that by rotating the steering wheel 180°, axle 11 may readily be moved from one neutral position to another and by oscillating the steering wheel back and forth approximately 30° from a straight ahead position, the vehicle of this invention may be readily propelled in either forward or rearward direction. This back and forth movement of the steering wheel and its attendant swinging of axle 11 may be referred to as sculling.

Vehicle 1 includes a generally vertical shaft 19 journalled in frame 3 and extending above and below the frame, the axis of shaft 19 being coincident with swing axis S. Steering wheel 17 is secured atop shaft 19 in a generally horizontal position and a support 21 is secured to the lower end of shaft 19 and is swingable in a generally horizontal plane about swing axis S upon rotation of steering wheel 17 and shaft 19. More particularly, support 21 is a generally U-shaped arm of spring steel or other resilient material having a shorter arm 21a secured to shaft 19 and a longer arm 21b having axle 11 secured to the outer end thereof whereby wheel axis W is offset from swing axis S a predetermined distance, this distance being referred to as a sculling length. Thus, as steering wheel 17 is rotated back and forth, front wheels 9 on axle 11 are swung in a horizontal plane relative to the longitudinal axis of the vehicle, this back and forth swinging movement of the wheels being referred to as sculling. As heretofore indicated, this sculling action via unidirectional drive means 18 effects forward or rearward propulsion of the vehicle, depending on whether axle 11 is in its first or second neutral position. Seat 5 is secured to frame 3 by means of a U-shaped spring arm 23. Vehicle 1 may also be provided with resilient bumpers 25 at the ends of frame 3 and foot rests 27 extending laterally of the frame at opposite sides thereof at the forward end of the frame for supporting the rider's feet.

Front axle 11, as shown, comprises a length of pipe welded as indicated at 31 (see FIG. 4) to arm 21b at the outer end of the arm, with stud shafts 33 (see FIGS. 5 and 6) secured to the ends of the pipe and extending outwardly therefrom. Each of the front wheels 9 has a hub 35 mounted on stub shaft 33 at the respective end of axle 11 by means of an overruning clutch and bearing assembly, the overruning clutch of which serves as the unidirectional drive means 18 for each wheel. This assembly may be one marketed by the Torrington Company of Torrington, Conn. and such as is shown in U.S. Pat. No. 3,194,368, comprising two outer bearing races 37 (see FIG. 5) and, between these races, an overruning clutch mechanism including a roller cage 39 and rollers 41, all in a cup 43 secured to the hub 35 of the wheel. The rollers lie in axial slots 45 in the cage and the cup has ramps 47 on the inside for wedging the rollers against shaft 33 on counterclockwise rotation of the cup about the shaft as viewed in FIG. 5. The clutch and bearing assembly is arranged so as to backstop the wheel, i.e., to lock it against rotation in one direction on its stub shaft, while permitting it to rotate freely in the other direction on the stub shaft (clockwise as viewed in FIG. 5). Each stub shaft has means as indicated at 49 in FIG. 6 at its outer end retaining the clutch and bearing assembly on the shaft. It will be understood, however, that other types of one-way clutches and anti-reverse means may be used in place of the one-way clutch above described.

In accordance with this invention, the ratio of the distance between swing axis S and wheel axis W (as indicated by Y in FIG. 4) relative to the spacing of wheels 9 on wheel axis W (as indicated by X) is preferably within prescribed limits. For example, if the ratio Y/X is greater than about 1.00, it may be found difficult to steer the vehicle while coasting because small deviations of the steering wheel from its straight-ahead position may cause walking of the vehicle rather than coasting. On the other hand, if the ratio is less than about 0.75, the vehicle may not be propelled forwardly as rapidly as desirable. It has been found that the optimum ratio of sculling length to wheel spacing (Y/X) is approximately 0.87.

Figure 4:
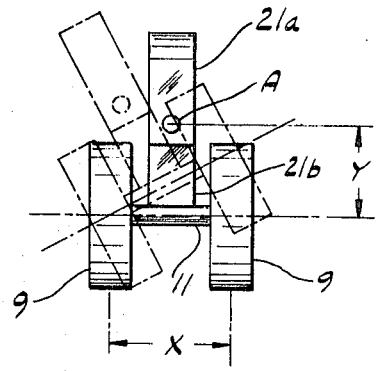
FIG. 4 is a horizontal section on line 4—4 of FIG. 2 illustrating the steerable drive wheels in a first neutral position and, as shown in phantom, in a rotated position for propelling and/or steering the vehicle in a generally forward direction.

Referring now to FIG. 4, the driving and steering wheels 9 on axle 11 are shown in solid lines in their first neutral position in which the vehicle may coast forward. Upon turning the steering wheel to the right approximately 30°, the right-hand wheel 9 is free to move forward via its unidirectional drive clutch 18 to the position shown in phantom in FIG. 4 and the left wheel 9 is held against reverse rotation by its unidirectional drive clutch 18 and thus pivots on its point of contact with the ground. It will be noted that the longitudinal center line of the vehicle is shifted somewhat to the left of the position it occupies when the wheels are in their straight-ahead position and that the vehicle has moved forward. Steering wheel 17 is rotated in the opposite direction (i.e., to the left) so as to reverse the angle of wheel axis W with respect to the longitudinal axis of the vehicle. Upon this reverse rotation of the steering wheel, the right-hand wheel 9 is held against reverse rotation and the left-hand wheel is free to rotate forwardly thus propelling the vehicle in forward direction.

Preferably, in vehicle 1 the spacing between the steerable drive wheels 9 and the rear or coasting wheels 13 and the location of the center of gravity of the combination vehicle and rider is such that the rear coasting wheels carry most of the weight (e.g., about 85%) and the front steerable drive wheels 9 carry the remainder of the weight. It will be understood, however, that the spacing of the wheels relative to the center of gravity may vary considerably and operation of the vehicle will be satisfactory.

Also, with drive wheels 9 rotated approximately 90° to their positions shown in FIG. 1, back and forth sculling movement of the steering wheel 17 approximately 15° will cause the vehicle to rotate in a tight circle pivoting on its rear wheels.

It will be understood that vehicle 1 may be propelled and steered in a variety of paths including straight-line paths and curved paths, for example, such as in a FIG. "8."

Figure 8:
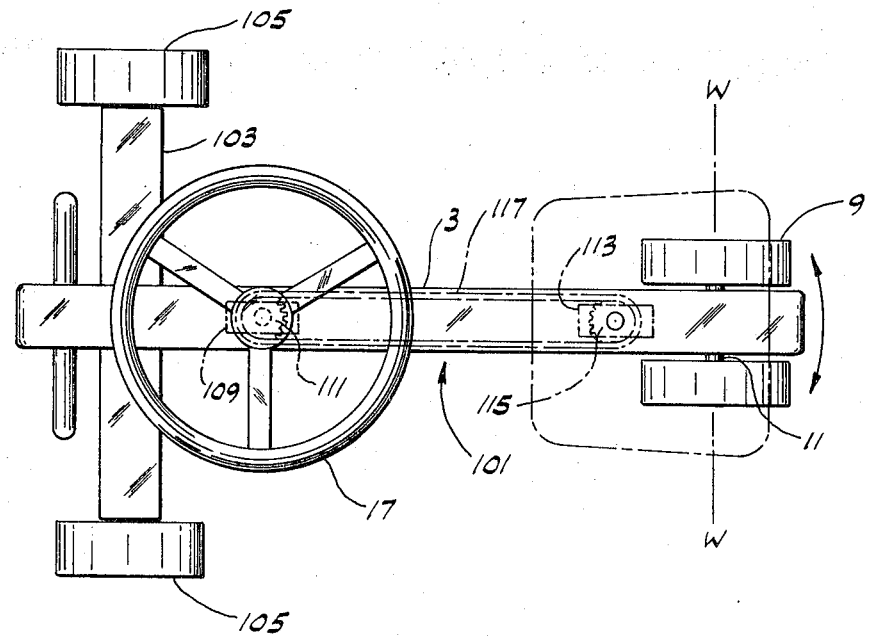
FIG. 8 is a plan view of a second embodiment of a rider-propelled vehicle of this invention having its steerable drive wheels at the rear of the vehicle.
Figure 9:
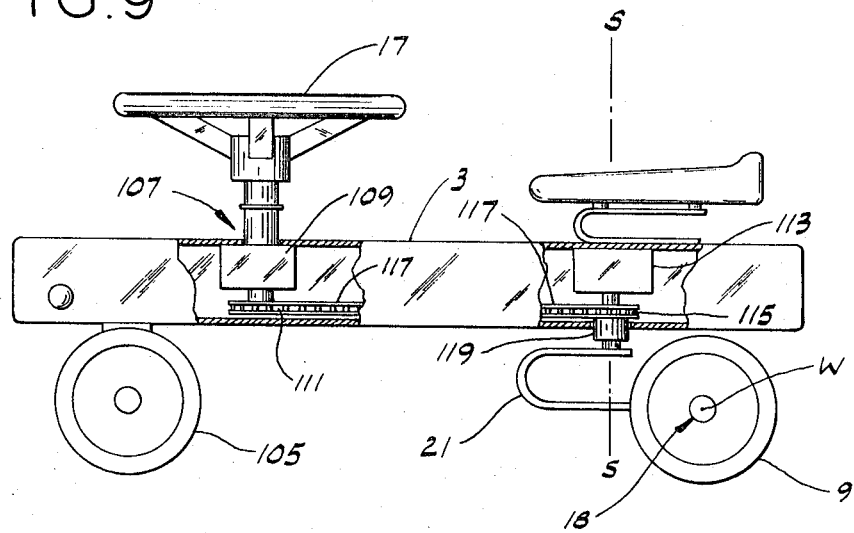
FIG. 9 is a side elevational view of the vehicle of FIG. 8.

Referring to FIGS. 8 and 9, a second embodiment of the vehicle of this invention is indicated in its entirety at 101 to distinguish it from vehicle 1 heretofore described. Corresponding reference characters in FIGS. 1-7 and in FIGS. 8 and 9 indicate corresponding parts having identical functions and are not here again explained. Vehicle 101 carries a fixed axle 103 at its forward end having wheels 105 journalled thereon. A swingable axle 11 having steerable drive wheels 9 journalled thereon is mounted for swinging movement at the rear end of the frame on upright swing axis S. Axle 11 is rotatable 360° about its swing axis and, as heretofore described, wheels 9 each include a unidirectional drive means 18. As with vehicle 1 heretofore described, rider vehicle 101 includes rider operable means 107 for propelling and steering the vehicle including a drive for swinging the axle about its upright swing axis S. More particularly, this drive means includes a steering wheel 17, a first or front gear box 109 driven by the steering wheel and having an output chain sprocket 111. A second or rear gear box 113 is secured to the vehicle frame at the rear end thereof and has a driven sprocket 115 with a drive chain 117 trained around sprockets 111 and 115. Gear box 113 has an output shaft 119 to which a support arm 21 mounting axle 11 is secured. It will be understood that the gearing of gear boxes 109 and 113 is such that upon rotation of the steering wheel in one direction (i.e., to the left as shown in FIG. 8) axle 11 and wheels 9 are swung to the right so as to turn the vehicle in the direction the steering wheel is turned (i.e., to the left). Similarly, when the steering wheel is turned to the right, the vehicle will turn to the right. Thus, the vehicle may be steered in a desired direction by turning the steering wheel in that direction. This feature enables young children without highly developed hand/eye coordination to readily become proficient in riding the vehicle.

It will be understood with the rear wheel drive arrangement of vehicle 101 of this invention, that the vehicle may be propelled forwardly by turning the steering wheel back and forth to effect sculling movement of the rear wheels about a first neutral position (as shown in FIG. 1) thereby to drive the vehicle via unidirectional drive means 18 in forward direction. It will be further understood, that similar to vehicle 1, wheels 9 of vehicle 101 may be rotated 180° to a second neutral position (not shown) in which the steering wheel may be rotated back and forth to effect sculling movement of the wheels and to effect propulsion of the vehicle in reverse direction.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rider-propelled wheeled vehicle comprising:
   a frame;
   a seat mounted on the frame for supporting the rider;
   wheel means for supporting the frame above the ground including an axle mounted for swinging movement midway between its ends relative to the frame on an upright axis, said axis being rotatable 360° about its upright axis, said wheel means including a pair of wheels carried by said swingable axle spaced generally at equal distances on opposite sides of said upright axis with the wheels on a common generally horizontal axis; and
   rider operable means for propelling and steering said vehicle including means for swinging said axle about its upright axis and means associated with each wheel carried by said swingable axle permitting rotation thereof in one direction with respect to said axle but preventing rotation thereof in the opposite direction with respect to the axle, said swingable axle being adapted to occupy a first neutral position in which the axis of the wheels is generally perpendicular to the longitudinal axis of the vehicle and the wheels are rotatable so as to permit forward rolling of the vehicle in the direction of its longitudinal axis, said swingable axle being adapted to occupy a second neutral position in which the axis of the wheels is generally perpendicular to the longitudinal axis of the vehicle and the wheels are rotatable so as to permit rearward rolling of the vehicle in the direction of its longitudinal axis, said axle being swingable on said upright axis in opposite directions about its first neutral position for effecting generally forward propulsion of the vehicle via one wheel being held against reverse rotation while the other rotates in forward direction and the axle swings forward on the point of engagement of the held wheel with the ground thereby to propel the vehicle forward, said axle being similarly swingable on said upright axis in opposite directions about its second neutral position for effecting generally rearward propulsion of the vehicle via one wheel being held against forward rotation while the other rotates in reverse direction and the axle swings rearward on the point of engagement of the last-mentioned held wheel thereby to propel the vehicle backwards.

2. A vehicle as set forth in claim 1 wherein said wheel means further comprises a fixed axle extending generally at right angles to the longitudinal axis of said vehicle and a pair of wheels carried by said fixed axle.

3. A vehicle as set forth in claim 2 wherein the means associated with each swingable axle wheel for permitting unidirectional rotation thereof are interposed between the wheel and the swingable axle.

4. A vehicle as set forth in claim 3 wherein said swingable axle is forward of said fixed axle and wherein said upright axis is toward the front end of the vehicle.

5. A vehicle as set forth in claim 4 wherein said vehicle has an arm pivoted on said upright axis, said arm carrying said swingable axle, the latter being offset from the upright axis, and wherein said rider operable means comprises a steering wheel secured to said arm manipulatable by the rider for swinging the arm and the swingable axle on said upright axis.

6. A vehicle as set forth in claim 3 wherein said swingable axle is behind said fixed axle and wherein the upright axis is toward the rear end of the vehicle.

7. A vehicle as set forth in claim 6 wherein said vehicle includes an arm carrying said swingable axle pivoted on said upright axis and wherein said rider operable means for propelling and steering said vehicle includes a steering wheel and means interconnecting said steering wheel and said swingable axle for effecting swinging of said swingable axle in the opposite direction said steering wheel is rotated so that said vehicle turns in the direction the steering wheel is turned.

8. A vehicle as set forth in claim 1 wherein the swingable axle when in its first neutral position is closer to the center of gravity of the vehicle than said upright axis.

9. A vehicle as set forth in claim 3 wherein the ratio of the distance between the upright axis and the swingable axle to the distance the wheels mounted on the swingable axle are spaced ranges between about 0.75 and 1.00.

10. A vehicle as set forth in claim 9 wherein said ratio is approximately 0.87.

* * * * *